(12) United States Patent
Andrews et al.

(10) Patent No.: US 8,797,868 B2
(45) Date of Patent: Aug. 5, 2014

(54) ENERGY-EFFICIENT NETWORK DEVICE WITH COORDINATED SCHEDULING AND RATE CONTROL USING NON-ZERO BASE POWER

(75) Inventors: Daniel Matthew Andrews, Chatham, NJ (US); Yihao Zhang, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 113 days.

(21) Appl. No.: 13/420,192

(22) Filed: Mar. 14, 2012

(65) Prior Publication Data

US 2013/0243009 A1    Sep. 19, 2013

(51) Int. Cl.
| | |
|---|---|
| *H04L 12/26* | (2006.01) |
| *H04Q 11/00* | (2006.01) |
| *H04L 12/54* | (2013.01) |
| *H04J 3/06* | (2006.01) |
| *G06F 1/04* | (2006.01) |
| *G06F 1/12* | (2006.01) |
| *G06F 9/00* | (2006.01) |

(52) U.S. Cl.
USPC ........... 370/232; 370/253; 370/412; 370/429; 370/516; 712/220; 713/503; 713/600

(58) Field of Classification Search
CPC .................................................. H04L 12/2676
USPC ............ 370/252–254, 282, 419, 429; 702/60, 702/61; 713/323, 330, 340
See application file for complete search history.

(56) References Cited

U.S. PATENT DOCUMENTS

| | | | | |
|---|---|---|---|---|
| 6,400,773 | B1 * | 6/2002 | Krongold et al. | 375/260 |
| 6,452,933 | B1 * | 9/2002 | Duffield et al. | 370/415 |
| 6,973,098 | B1 * | 12/2005 | Lundby et al. | 370/491 |
| 7,944,839 | B2 * | 5/2011 | Siris | 370/236 |
| 2003/0137945 | A1 | 7/2003 | Yavatkar et al. | |
| 2006/0114836 | A1 * | 6/2006 | Pollin et al. | 370/252 |
| 2011/0149990 | A1 | 6/2011 | Francini et al. | |
| 2011/0225318 | A1 | 9/2011 | Andrews et al. | |
| 2012/0106571 | A1 * | 5/2012 | Jeon et al. | 370/465 |
| 2013/0155919 | A1 * | 6/2013 | Jung | 370/310 |

OTHER PUBLICATIONS

M. Andrews et al., "Minimum-Cost Network Design with (Dis)economies of Scale," 51st Annual IEEE Symposium on Foundations of Computer Science (FOCS), Oct. 2010, pp. 585-592, Las Vegas, Nevada.

(Continued)

*Primary Examiner* — Xavier Szewai Wong
*Assistant Examiner* — Peian Lou
(74) *Attorney, Agent, or Firm* — Ryan, Mason & Lewis, LLP (57) ABSTRACT

A network device of a communication network is configured to implement coordinated scheduling and processor rate control. In one aspect, packets are received in the network device and scheduled for processing from one or more queues of that device. An operating rate of a processor of the network device is controlled based at least in part on an optimal operating rate of the processor that is determined using a non-zero base power of the processor. For example, the operating rate of the processor may be controlled such that the processor either operates at or above the optimal operating rate, or is substantially turned off. The optimal operating rate of the processor may be selected so as to fall on a tangent line of a power-rate curve of the processor that also passes through an origin point of a coordinate system of the power-rate curve.

20 Claims, 3 Drawing Sheets

(56) References Cited

OTHER PUBLICATIONS

M. Andrews et al., "Energy-Aware Scheduling Algorithms for Network Stability," IEEE International Conference on Computer Communications (INFOCOM), Apr. 2011, pp. 1359-1367, Shanghai, China.

M. Andrews et al., "Routing and Scheduling for Energy and Delay Minimization in the Powerdown Model," IEEE International Conference on Computer Communications (INFOCOM), Mar. 2010, pp. 1-5, San Diego, California.

M. Andrews et al., "Routing for Energy Minimization in the Speed Scaling Model," IEEE International Conference on Computer Communications (INFOCOM), Mar. 2010, pp. 1-9, San Diego, California.

M. Andrews et al., "Universal-Stability Results and Performance Bounds for Greedy Contention-Resolution Protocols," Journal of the ACM, Jan. 2001, pp. 39-69, vol. 48, No. 1.

M. Andrews et al., "The Effects of Temporary Sessions on Network Performance," 11th Annual ACM-SIAM Symposium on Discrete Algorithms (SODA), Jan. 2000, pp. 448-457.

N. Bansal et al., "Average Rate Speed Scaling," 8th Latin American Theoretical Informatics Symposium (LATIN), Apr. 2008, pp. 240-251, Búzios, Brazil.

N. Bansal et al., "Speed Scaling to Manage Energy and Temperature," Journal of the ACM, Mar. 2007, 39 pages, vol. 54, No. 1, Article 3.

N. Bansal et al., "Speed Scaling with an Arbitrary Power Function," 20th Annual ACM-SIAM Symposium on Discrete Algorithms (SODA), Jan. 2009, pp. 693-701.

S. Bhaumik et al., "Breathe to Stay Cool: Adjusting Cell Sizes to Reduce Energy Consumption," 1st ACM SIGCOMM Workshop on Green Networking, Aug. 2010, pp. 41-46, New Delhi, India.

A. Borodin et al., "Adversarial Queuing Theory," Journal of the ACM, Jan. 2001, pp. 13-38, vol. 48, No. 1.

J-Y. Le Boudec et al., "Network Calculus, A Theory of Deterministic Queuing Systems for the Internet," Springer Verlag, LNCS 2050, Dec. 2011, 263 pages.

H.L. Chan et al., "Energy Efficient Online Deadline Scheduling," 18th Annual ACM-SIAM Symposium on Discrete Algorithms (SODA), Jan. 2007, pp. 795-804, New Orleans, Louisiana.

A. Demers et al., "Analysis and Simulation of a Fair Queueing Algorithm," Journal of Internetworking: Research and Experience, Sep. 1990, pp. 3-26, vol. 1, No. 1.

"Enhanced Intel SpeedStep Technology for the Intel Pentium M Processor," Intel White Paper, Mar. 2004, Order No. 301170-001, 12 pages.

A. Francini et al., "Performance Bounds of Rate-Adaptation Schemes for Energy-Efficient Routers," IEEE International Conference on High Performance Switching and Routing (HPSR), Jun. 2010, pp. 175-182, Richardson, Texas.

Matthew Garrett, "Powering Down," Communications of the ACM, Sep. 2008, pp. 42-46, vol. 51, No. 9.

C. Gunaratne et al., "Reducing the Energy Consumption of Ethernet with Adaptive Link Rate (ALR)," IEEE Transactions on Computers, Apr. 2008, pp. 448-461, vol. 57, No. 4.

M. Gupta et al., "Greening of the Internet," ACM SIGCOMM Conference on Applications, Technologies, Architectures, and Protocols for Computer Communication, Aug. 2003, pp. 19-26, Karlsruhe, Germany.

M. Gupta et al., "Dynamic Ethernet Link Shutdown for Energy Conservation on Ethernet Links," IEEE International Conference on Communications (ICC), Jun. 2007, pp. 6156-6161, Glasgow, Scotland.

M. Gupta et al., "Using Low-Power Modes for Energy Conservation in Ethernet LANs," IEEE International Conference on Computer Communications (INFOCOM), May 2007, pp. 2451-2455, Anchorage, Alaska.

S. Irani et al., "Algorithmic Problems in Power Management," SIGACT News, 2005, pp. 63-76, vol. 36, No. 2.

S. Irani et al., "Algorithms for Power Savings," ACM Transactions on Algorithms, Nov. 2007, 23 pages, vol. 3, No. 4, Article 41.

S. Irani et al., "Online Strategies for Dynamic Power Management in Systems with Multiple Power-Saving States," ACM Transactions on Embedded Computing Systems, Aug. 2003, pp. 325-346, vol. 2, No. 3.

M. Li et al., "Min-Energy Voltage Allocation for Tree-Structured Tasks," COCOON, Lecture Notes in Computer Science (LNCS), 2005, pp. 283-296, vol. 3595.

M. Lin et al. "Dynamic Right-Sizing for Power-Proportional Data Centers," 30th IEEE International Conference on Computer Communications (INFOCOM), Apr. 2011, pp. 1098-1106, Shanghai, China.

S. Nedevschi et al., "Reducing Network Energy Consumption via Sleeping and Rate-Adaptation," 5th USENIX Symposium on Networked Systems Design and Implementation (NSDI), Apr. 2008, pp. 323-336, San Francisco, California.

B. Nordman et al., "Reducing the Energy Consumption of Networked Devices," IEEE 802.3 Tutorial, Jul. 2005, pp. 1-30, San Francisco, California.

A.K. Parekh et al., "A Generalized Processor Sharing Approach to Flow Control in Integrated Services Networks: The Multiple Node Case," IEEE/ACM Transactions on Networking, Apr. 1994, pp. 137-150, vol. 2, No. 2.

A.K. Parekh et al., "A Generalized Processor Sharing Approach to Flow Control in Integrated Services Networks: The Single-Node Case," IEEE/ACM Transactions on Networking, Jun. 1993, pp. 344-357, vol. 1, No. 3.

A. Wierman et al., "Power-Aware Speed Scaling in Processor Sharing Systems," IEEE INFOCOM, Apr. 2009, pp. 2007-2015, Rio de Janeiro, Brazil.

F. Yao et al., "A Scheduling Model for Reduced CPU Energy," 36th Annual Symposium on Foundations of Computer Science (FOCS), Oct. 1995, pp. 374-382, Milwaukee, Wisconsin.

U.S. Appl. No. 13/078,599, filed in the name of D.M. Andrews et al. on Apr. 1, 2011 and entitled "Energy-Efficient Network Device with Coordinated Scheduling and Processor Rate Control."

* cited by examiner

ENERGY-EFFICIENT NETWORK DEVICE WITH COORDINATED SCHEDULING AND RATE CONTROL USING NON-ZERO BASE POWER

FIELD

The present invention relates generally to communication networks, and more particularly to techniques for processing packets in network devices of a communication network.

BACKGROUND

U.S. telecommunication infrastructure is estimated to consume 60 billion kilowatt hours of power per year. Such an enormous consumption partially results from the fact that most networks are engineered to handle peak traffic. Network devices such as routers and switches tend to operate at full speed and consume maximum power, while typical traffic levels are only a small fraction of the maximum throughput.

One known approach to reducing energy consumption in a network involves powering down particular network devices from time to time. For example, these network devices may be placed into a sleep mode, an off state or other type of inactive state in which power consumption of the network device is considerably reduced relative to its maximum power consumption. However, during such downtime any packets arriving at the network device for processing have to be buffered, and this can cause significant delay in the transport of the packets through the network. Thus, minimizing the period of time that the network devices are in their respective active states and minimizing delays in packet transmission through the network become two conflicting goals. This problem is compounded by the fact that there is often a considerable transition time involved in switching a given network device between its active and inactive states.

In order to address the costs associated with transition of network devices between their active and inactive states, it has been proposed that edge routers of a network be configured to group packets having the same source and destination and to transmit the resulting groups in bursts, in order to reduce the number of transitions and increase the inactive time of the network devices. See S. Nedevschi et al., "Reducing Network Energy Consumption via Sleeping and Rate-Adaptation," in J. Crowcroft and M. Dahlin, eds., NSDI, pp. 323-336, USENIX Association, 2008. However, such an approach can still lead to considerable delay for packet transmission through the network, and fails to provide a global optimization that simultaneously addresses both energy consumption and delay minimization.

Improved techniques that simultaneously address both energy consumption and delay minimization are disclosed in U.S. patent application Ser. No. 12/723,116, filed Mar. 12, 2010 and entitled "Network Scheduling for Energy Efficiency," which is incorporated by reference herein. In one of the disclosed techniques, a communication network comprising a plurality of network devices is configured to implement scheduling for energy efficiency. More particularly, a set of network devices interconnected in a line within a network is identified, and a common frame size is established. For each of the network devices of the line, active and inactive periods for that network device are scheduled in a corresponding frame having the common frame size, with the frames in the respective network devices of the line being time shifted relative to one another by designated offsets. For each of one or more of the active periods of each of the network devices of the line, received packets are scheduled for processing in that network device. Such an arrangement improves the energy efficiency of a communication network by scheduling active and inactive periods for particular nodes of the network in a coordinated manner that minimizes the impact of transitions between active and inactive periods on packet delay.

Another issue that arises in a communication network relates to scheduling data packets for processing in a manner that ensures that queue length within a given network device remains bounded over time. Numerous scheduling algorithms have been developed that ensure bounded queue length. However, such scheduling algorithms generally assume that the network device processor always operates at its full rate whenever that network device is in an active state. Although this may be optimal for clearing queue backlogs as fast as possible, it is often suboptimal in terms of energy consumption, and therefore undermines the energy efficiency of the overall network.

These and other issues are addressed in U.S. patent application Ser. No. 13/078,599, filed Apr. 1, 2011 and entitled "Energy-Efficient Network Device with Coordinated Scheduling and Processor Rate Control," which is incorporated by reference herein. For example, illustrative embodiments disclosed in this reference provide coordinated scheduling and processor rate control techniques that significantly increase the energy efficiency of a communication network while also ensuring bounded queue lengths over time and minimizing packet delay through the network.

Notwithstanding the considerable advances provided by techniques disclosed in the above-cited patent applications, a need remains for further improvements in coordinated scheduling and processor rate control.

SUMMARY

Illustrative embodiments of the present invention provide improved coordinated scheduling and processor rate control techniques that explicitly take into account the possibility of processors having non-zero base power. These techniques can significantly increase the energy efficiency of a communication network while also ensuring bounded queue lengths over time and minimizing packet delay through the network.

In one aspect, a network device of a communication network is configured to implement coordinated scheduling and processor rate control. Packets are received in the network device and scheduled for processing from one or more queues of that device. An operating rate of a processor of the network device is controlled based at least in part on an optimal operating rate of the processor that is determined using a non-zero base power of the processor.

By way of example, the operating rate of the processor may be controlled such that the processor either operates at or above the optimal operating rate, or is substantially turned off. The optimal operating rate of the processor may be selected so as to fall on a tangent line of a power-rate curve of the processor that also passes through an origin point of a coordinate system of the power-rate curve.

The illustrative embodiments include batch-based rate-adaptive algorithms and average rate based rate-adaptive algorithms.

The disclosed algorithms considerably improve the energy efficiency of a communication network by adaptively controlling the operating rate of a processor, using an optimal operating rate that is determined using non-zero base power, in coordination with scheduling of packets for processing in a network device.

These and other features and advantages of the present invention will become more apparent from the accompanying drawings and the following detailed description.

DETAILED DESCRIPTION

Illustrative embodiments of the invention will be described herein with reference to exemplary communication networks, network devices and associated coordinated scheduling and rate adaptation processes. It should be understood, however, that the invention is not limited to use with the particular networks, devices and processes described, but is instead more generally applicable to any network application in which it is desirable to provide improved energy efficiency by coordinated scheduling and rate adaptation within each of a plurality of network devices.

Figure 1:
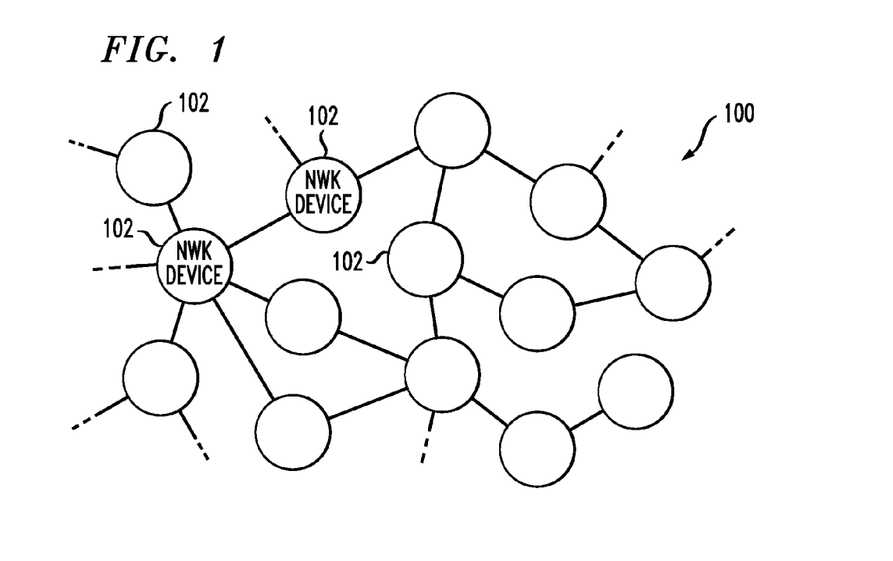
FIG. 1 shows a communication network in an illustrative embodiment of the invention.

FIG. 1 shows a communication network 100 comprising a plurality of interconnected network devices 102. The network devices 102 may comprise routers, switches, servers, computers or other processing devices, in any combination, examples of which may also be referred to herein as network nodes or terminals. A given network device will generally comprise a processor and a memory coupled to the processor, as well as a transceiver which allows the network device to communicate with the other network devices to which it is interconnected.

As will be described in greater detail below, one or more of the network devices 102 of the network 100 are configured to implement a coordinated scheduling and rate adaptation process that significantly increases the energy efficiency of the network device and thus of the communication network as a whole. The coordinated scheduling and rate adaptation process may be implemented in a combined scheduling and rate adaptation module provided within each of the network devices 102. In such an embodiment, the process is fully distributed, with each network device independently performing its associated scheduling and rate adaptation operations. In other embodiments, a centralized controller may be coupled to multiple network devices in order to facilitate the scheduling and rate adaptation operations of those devices. Embodiments of the invention may therefore be fully distributed, fully centralized, or may utilize a hybrid of distributed and centralized control.

The network 100 may comprise any type of communication network suitable for transporting data or other signals, and the invention is not limited in this regard. For example, portions of the network 100 may comprise a wide area network such as the Internet, a metropolitan area network, a local area network, a cable network, a telephone network, a satellite network, as well as portions or combinations of these or other networks. The term "network" as used herein is therefore intended to be broadly construed.

Figure 2:
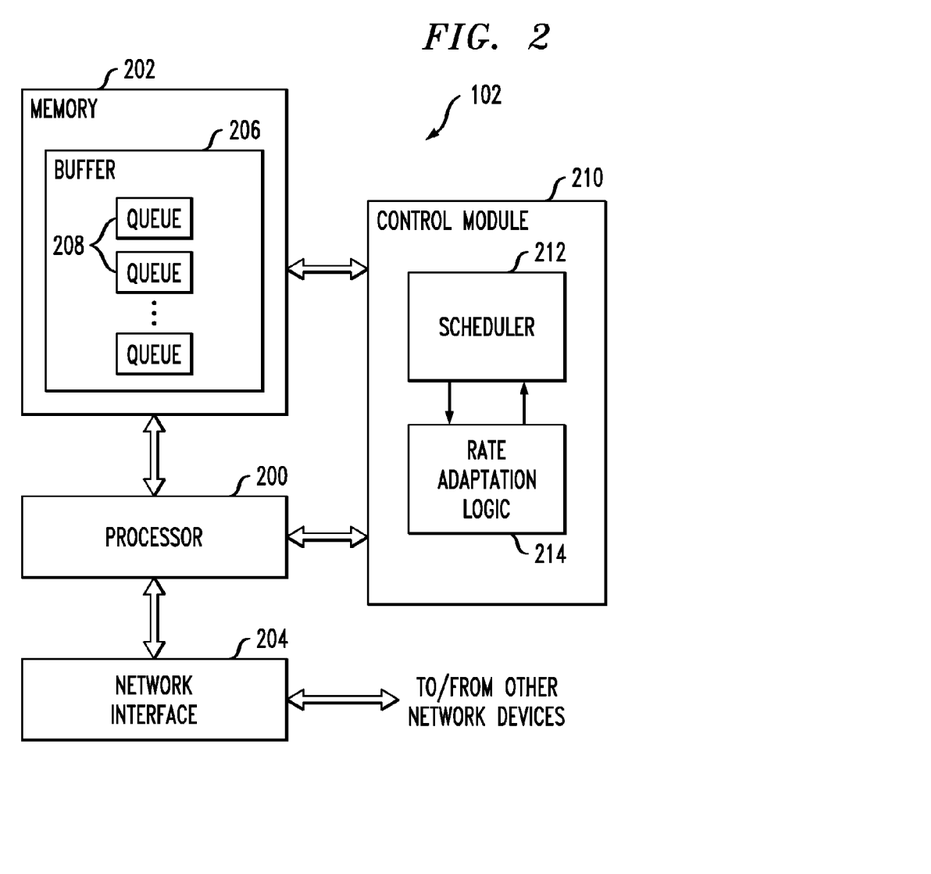
FIG. 2 is a more detailed view of a particular network device of the FIG. 1 network.

Referring now to FIG. 2, one possible implementation of a given network device 102 of the network 100 is shown. In this embodiment, the given network device 102 comprises a processor 200 coupled to a memory 202, and further network interface circuitry 204. The memory 202 comprises a buffer 206 having a plurality of queues 208 for storing received packets to be transmitted or otherwise processed by the network device. It should be noted that the term "packet" as used herein is intended to be construed broadly, so as to encompass, for example, a wide variety of different types of protocol data units, where a given protocol data unit may comprise at least one payload as well as additional information such as one or more headers.

Also included in the network device is a control module 210 that in this embodiment is implemented as a combined scheduler and rate adaptation module. The control module 210 comprises a scheduler 212 coupled to rate adaptation logic 214. The control module in the present embodiment is configured to implement coordinated scheduling and processor rate control in which an operating rate of the processor 200 of the network device 102 is controlled based at least in part on at least one of an arrival rate of the packets in the device and a number of the packets stored in at least one of the queues 208. The operating rate may be controlled, for example, by adjusting a clock speed of the processor, or a service rate of the processor. The term "operating rate" is therefore intended to be broadly interpreted to encompass these and other arrangements.

The processor 200 may be implemented as a microprocessor, a microcontroller, an application-specific integrated circuit (ASIC), field-programmable gate array (FPGA), or other type of processing device, as well as portions or combinations of such devices. The memory 202 may comprise an electronic random access memory (RAM), a read-only memory (ROM), a disk-based memory, or other type of storage device, as well as portions or combinations of such devices. The processor and memory may be used in storage and execution of one or more software programs for performance of coordinated scheduling and rate adaptation operations within the network device. The control module 210 or portions thereof may therefore be implemented at least in part using such software programs.

The memory 202 is assumed to include in addition to buffer 206 one or more other storage areas, such as one or more storage areas that may be utilized for program code storage. The memory 202 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 200, memory 202 and interface circuitry 204 may comprise well-known conventional circuitry suitably modified to operate in the manner described herein. Conventional aspects of such circuitry are well known to those skilled in the art and therefore will not be described in detail herein.

It is to be appreciated that a network device as disclosed herein may be implemented using components and modules other than those specifically shown in the exemplary arrangement of FIG. 2.

Figure 3:
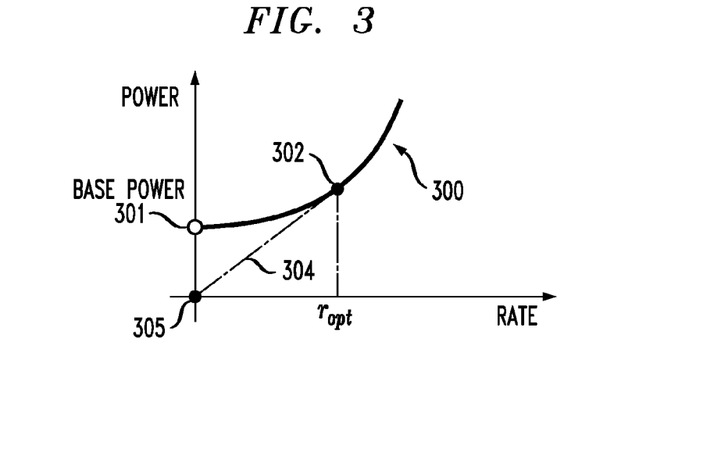
FIG. 3 shows a power-rate curve having a non-zero base power.

The processor 200 in the present embodiment has a power-rate curve that exhibits a non-zero base power. An example of such a power-rate curve is shown in FIG. 3. The power-rate curve 300 as shown is a plot of processor power as a function of its operating rate. It begins at a point 301 of non-zero base power, and increases with operating rate as illustrated. The curve passes through a point 302 that corresponds to an optimal operating rate denoted $r_{opt}$. The optimal rate $r_{opt}$ may be characterized, for example, as an operating rate that consumes the lowest amount of power per bit, although other characterizations of $r_{opt}$ may be used in other embodiments. More generally, $r_{opt}$ may be viewed as the most power-efficient operating rate of the processor. It should be appreciated, however, that the term "optimal operating rate" as used herein is intended to be more broadly construed, and may encompass a variety of different types of optimization.

The optimal operating rate $r_{opt}$ and the origin point of the coordinate system in the FIG. 3 example define a tangent line 304 of the power-rate curve 300. The origin point is denoted by reference numeral 305, and denotes a zero power and zero rate origin point of the coordinate system of the power-rate curve 300. Thus, the tangent line 304 in the present embodiment passes through points 302 and 305, corresponding to the optimal operating rate $r_{opt}$ and the origin point, respectively.

The exemplary power-rate curve 300 of FIG. 3 uses the power-rate function $f(x)=c+x^\alpha$ for $x>0$ where $c$ denotes the base power. This function will now be described in greater detail.

Assume the network device 102 comprises a server which operates at a rate $r_e(t)$ at time t. For convenience, we perform our analysis in continuous time so that if a packet of size $l_p$ starts service at server e at time $\tau_0$, it completes service at time $$\tau_1 = \inf\left\{\tau_1 : \int_{\tau_0}^{\tau_1} r_e(t)dt \geq l_p\right\}.$$

Whenever a server is serving packets it incurs an energy cost. In particular, we assume that there is a function f(.) such that when server e is running at speed $r_e(t)$ at time t it consumes power $f(r_e(t))$. Therefore, the total energy consumed during the time interval $[\tau_0, \tau_1)$ is given by $$\int_{\tau_0}^{\tau_1} f(r_e(t))dt.$$

One common power-rate function has the form $$f_1(x) = x^\alpha,$$

The value of $\alpha$ is typically a small constant (e.g., $\leq 3$). However, in many situations a smooth convex function of this type may not be appropriate. In particular, in many systems there is server hardware for which, although power is an increasing function of rate, there is some fixed power needed to keep the server operational whenever it is operating at a non-zero rate. In these and other similar systems it is advantageous to consider a power-rate function of the form:

$$f_2(x) = \begin{cases} c + x^\alpha & x > 0 \\ 0 & x = 0. \end{cases}$$

As noted above, we refer to c as the base power. One consequence of this function is that it sometimes makes sense to run a server slightly faster than is strictly necessary to meet network QoS constraints if this allows us to turn off the server to rate zero at other times. Another way of saying this is that, unlike the case with no base power, when $c>0$ the power-rate function is no longer strictly convex. It exhibits aspects of a convex or superadditive function due to the $x^\alpha$ term but also exhibits aspects of a subadditive function due to the c term.

As will be described in more detail below, embodiments of the invention involve determining the optimal operating rate $r_{opt}$, and configuring the control module 210 such that the processor 200 either operates at or above $r_{opt}$ or is instead turned off. This also involves coordinating off periods of the processor such that any minimum off period duration is satisfied.

It is to be appreciated that the particular power-rate function $f_2(x)$ described above is presented by way of example only, and that other power-rate functions having non-zero base power may be used in other embodiments. For example, one possible variant of the power-rate function $f_2(x)$ is as follows:

$$f_2'(x) = \begin{cases} c_1 + c_2 x^\alpha & x > 0 \\ 0 & x = 0. \end{cases}$$

Again, this is only an example, and numerous other power-rate functions may be used in other embodiments of the present invention.

The operation of the network devices 102 in illustrative embodiments will now be described in greater detail with reference to FIGS. 4 and 5 for exemplary batch-based and non-preemptive average rate (AVR) rate-adaptive algorithms, respectively. These embodiments provide coordinated scheduling and rate adaptation in which an operating rate of the processor 200 of the network device 102 is controlled based at least in part on the optimal operating rate $r_{opt}$ of the processor, as determined using a non-zero base power of a power-rate curve of the processor. The use of coordinated scheduling and processor rate adaptation saves energy by slowing down the processors under low traffic load conditions while also maintaining desired properties such as bounded queue lengths over time and minimized packet delay through the network.

It will be assumed without limitation for the examples below that the operating rate of the processor 200 may be set to any value in the interval $[R_{min}, R_{max}]$, where $R_{min}$ and $R_{max}$ are the respective minimum and maximum operating rates of the processor, and where $0 < R_{min} < R_{max}$. The minimum operating rate $R_{min}$ is assumed to be less than the optimum operating rate $r_{opt}$.

Also, it is further assumed that the processor can be "turned off" from the power perspective, that is, operated at a substantially zero rate. Thus, the processor more particularly operates at rate in $\{0, [r_{opt}, R_{max}]\}$. There should also be a certain holding time for the zero rate, since if the processor were allowed to toggle between the zero rate and $R_{min}$ with no penalty then the processor may switch between the two rates with excessive frequency. For example, if a traffic stream arrives at rate $R_{min}/2$, the processor can be on at rate $R_{min}$ for $\delta$ amount of time, and off at zero rate for $\delta$ amount of time. Without penalty, $\delta$ is allowed to approach zero, which is clearly undesirable. One way to prevent this undesired behavior is to impose a minimum duration $\Delta$, such that if a processor is operating at zero rate it has to remain at that rate for at least time $\Delta$.

Accordingly, embodiments of the invention may be configured to include an upper bound on how often the rate can be changed. In particular, a rate adaptation algorithm is referred to herein as "reactive" if it changes operating rate at most once in an amortized sense for every packet arrival or departure event at the network device. Hence, the network device is not permitted to rapidly change operating rate in between packet arrival and departure events. The rate adaptation algorithms to be described in conjunction with FIGS. 4 and 5 below are examples of reactive algorithms.

It should be noted that phrases such as "turned off" or "substantially turned off" are intended to encompass arrangements in which a processor is operated at or near a zero rate so as to consume negligible power.

Figure 4:
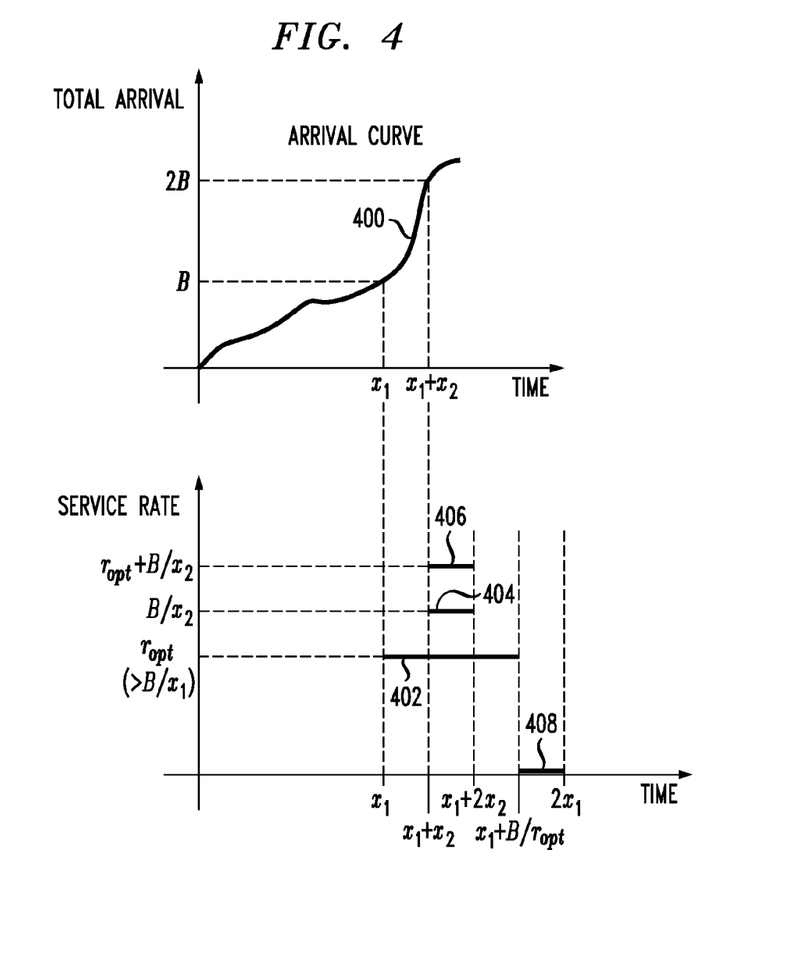
FIGS. 4 and 5 illustrate examples of rate adaptation techniques that take into account non-zero base power of the type shown in FIG. 3 and may be implemented by a combined scheduler and rate adaptation module in the network device of FIG. 2.

Referring now to FIG. 4, an illustrative embodiment is shown in which the operating rate of the processor 200 is controlled based on packet arrival rate, but also subject to the above-described optimal operating rate $r_{opt}$ described in conjunction with FIG. 3. The packet arrival rate may be determined, for example, by accumulating a designated number of the received packets, and then determining an average arrival rate of the accumulated packets. The operating rate of the processor 200 is controlled based on the average arrival rate while also taking into account the optimal operating rate $r_{opt}$, as will be described in greater detail below. Such an arrangement is an example of what is also referred to herein as a batch-based rate adaptation algorithm.

In this exemplary batch-based algorithm, the optimal operating rate $r_{opt}$ is initially computed or otherwise determined. Arriving packets are then accumulated in batches of B packets over respective time periods. The time periods correspond to respective processing intervals, and may also be referred to herein as service intervals or windows. Assume it takes x units of time to accumulate a given batch of B packets, where x can be different from one batch to the next, and the processing intervals generally can overlap. However, if we initially assume no overlap in the processing intervals, the operating rate of the processor is set in the following manner:

1. If $B/x \geq r_{opt}$, set the operating rate of the processor to B/x for the next x units of time.

2. If $B/x < r_{opt}$, for the next $B/r_{opt}$ units of time, set the operating rate of the processor to $r_{opt}$ and for the subsequent $x - B/r_{opt}$ units of time, set the operating rate of the processor to zero.

In the presence of overlapping processing intervals, the resulting total processing rate for any overlapped portions is determined as the combination of the corresponding individual overlapped rates.

The upper portion of FIG. 4 shows an arrival curve 400 of received packets. The arrival curve 400 is a plot of the number of packets received as a function of time. In this embodiment, an average arrival rate is determined by accumulating B packets and dividing by the time it took to accumulate those packets. For example, the arrival curve indicates that the first B packets are received over a time period of duration $x_1$ and thus the average arrival rate is determined as $B/x_1$. The operating rate of the processor, illustratively indicated in this example as a service rate in the lower portion of FIG. 4, is set to the optimal operating rate $r_{opt}$ for the time period between $x_1$ and $x_1 + x_2$, assuming that $r_{opt} > B/x_1$. This corresponds to the level denoted by reference numeral 402. Referring again to the upper portion of the figure, B additional packets are accumulated in the time period between $x_1$ and $x_1 + x_2$, bringing the total number of received packets to 2B at time $x_1 + x_2$. The average arrival rate is therefore again determined for the time period between $x_1$ and $x_1 + x_2$, leading to an average arrival rate determined as $B/x_2$. This corresponds to the level denoted by reference numeral 404 in the lower portion of the figure. The parameter B may be based on a size of one or more of the queues 208 of the buffer 206.

As indicated above, the "service rate" referred to in this embodiment is an example of what is more generally referred to herein as an "operating rate."

In the FIG. 4 embodiment, the average arrival rate determined based on packets arriving for a given time period is used to set the processor operating rate for a corresponding processing interval. The length of the processing interval in this example is twice the length of the time period over which the B packets were received.

In the example of FIG. 4, the optimal operating rate $r_{opt}$, where $r_{opt} > B/x_1$, is established for a first processing interval from $x_1$ to $x_1 + B/r_{opt}$ as indicated at 402, and the rate of $B/x_2$, where $r_{opt} < B/x_2$, is established for a second processing interval from $x_1 + x_2$ to $x_1 + 2x_2$ as indicated at 404. However, in this particular example it can be seen that the first and second processing intervals do in fact overlap with one another for a period of time from $x_1 + x_2$ to $x_1 + 2x_2$. For this overlapped period, the operating rate of the processor is set to a combined operating rate of $r_{opt} + B/x_2$. This combined operating rate corresponds to the level denoted by reference numeral 406. After the overlapped period, beginning at time $x_1 + B/r_{opt}$, the operating rate is set to zero, indicated by level 408, which corresponds to the processor being turned off. This state continues until time $2x_1$.

Thus, in the FIG. 4 embodiment, the average arrival rate is recomputed for each of a sequence of processing intervals, and adjacent ones of the processing intervals are permitted to partially overlap with one another. As indicated above, the combined rate is limited by the maximum operating rate $R_{max}$ of the processor. Accordingly, if the total combined rate exceeds $R_{max}$, then the processor operating rate is set to $R_{max}$ for as long as it needs to catch up with running the separate rates.

Although the batch size is given by B in the FIG. 4 embodiment, a variant using a batch size of 2B will be described in more detail below.

The batch-based rate adaptation illustrated in FIG. 4 can be advantageously combined with nearest-to-source (NTS) or farthest-to-go (FTG) scheduling in control module 210 to provide improved energy efficiency while maintaining a stable network configuration with acceptable bounds on queue length and end-to-end delay. In NTS scheduling, one of the packets that has traveled a shorter distance from its source in the network is given priority over another one of the packets that has traveled a longer distance from its source in the network. In FTG scheduling, one of the packets that has a longer distance to travel to its destination in the network is given priority over another one of the packets that has a shorter distance to travel to its destination in the network. Alternative embodiments of the invention can implement other types of scheduling algorithms in combination with the batch-based rate adaptation of FIG. 4, including, for example, FIFO scheduling. Another example of a scheduling algorithm that can be combined with rate adaptation as described herein is longest-in-system (LIS) scheduling, which gives priority to packets that have been in the network for the longest time and may therefore be regarded as a type of "global" FIFO scheduling.

A batch-based algorithm of the type illustrated in FIG. 4 will now be described in greater detail with particular reference to the power-rate function $f_2(x)$ given above. In this description, it is assumed that the network device comprises a server and also that maximum queue size in the server is bounded by the parameter B. For a given sequence of packet arrivals, let $Opt_B(t)$ be the minimum amount of energy used up to time t by any algorithm that keeps the queue size bounded by B. The objective is to relate the queue size of the algorithm to B and relate its energy consumption to $Opt_B(t)$ for all time t. The batch-based algorithm waits until a batch of data of a certain size has arrived at the server and then serves this data using an amount of energy that can be bounded with respect to $\text{Opt}_B(t)$. As mentioned previously, the power-rate function $f_2(x)$ has non-zero base power, and thus it can be more beneficial to turn off the server from time to time but operate it at a higher positive rate at other times. This is in contrast to arrangements which utilize a power-rate function such as $f_1(x)$ above, which has zero base power and in which it is generally always most beneficial to operate at the lowest possible rate.

It will be shown below that in this exemplary batch-based algorithm, the queue size is kept at most a log factor times B and the energy used is kept at O(1) times $\text{Opt}_B(t)$ where the constant depends on the exponent $\alpha$ of the power-rate function, and that the achieved queue-energy tradeoff is asymptotically the best possible. Moreover, the batch-based algorithm can be extended to the case of multiple servers. In this extension, if operating rate is selected at each server in accordance with the batch-based algorithm and all packets are scheduled using NTS scheduling that gives priority to packets according to the number of hops from the source, then queue size and energy are bounded relative to B and $\text{Opt}_{B,e}$ respectively, where $\text{Opt}_{B,e}$ is the optimal amount of energy used by server e so that the queue size at server e is never larger than B.

For purposes of illustration, the analysis to follow will make use of a number of traffic models, although it is to be appreciated that the disclosed techniques do not require that the traffic obey any particular model. We assume a set of data packets that arrive into a network comprising m servers. Each packet p has a size denoted by $l_p$ and has a fixed route through the network. We consider packet arrivals that conform to two different models. The first model is a connectionless model parameterized by $\sigma$. We assume that within any time interval of duration $\tau$, for any server e the total amount of data injected into the network that wishes to pass through server e is at most $\sigma+\tau$. Here we implicitly assume that time is scaled so that the maximum long-term injection rate to any server is at most 1. The second model is a connection-based model, in which we have a set of connections F, each of which comprises a route through the network. The injections into each connection i∈F are $(\sigma_i, \rho_i)$-controlled for some parameters $\sigma_i, \rho_i$ which means that the total size of the injections into connection-i during any interval of length $\tau$ is at most $\sigma_i+\rho_i\tau$. Again, these particular traffic models are utilized to illustrate the operation of certain embodiments, but should not be viewed as limiting in any way.

Assume that the batch-based algorithm repeatedly collects a fixed amount of traffic A in a window and then serves this amount of traffic A in the following window of the same duration. The service rate is A/t if t is the duration of the window in which the traffic is collected, where the duration changes from window to window depending on the traffic arrival.

Under the power-rate function $f_2(x)$, there is an optimal operating rate $r_{opt}$ under which the server should not operate unless it is turned off completely. More particularly, to process traffic amount A in time duration T in an energy efficient manner, the server operates at rate $r=\max\{r_{opt}, A/T\}$ for the duration T/r, where $$r_{opt} = \left(\frac{c}{\alpha-1}\right)^{1/\alpha}$$

We observe that, for energy minimization, a server only needs to operate at one non-zero rate in order to process traffic of amount A in duration T. This is due to the convexity of $f_2(x)$ for positive x>0. Let t be the time duration for which the server is active. The server operates at rate A/t when active and consumes a total energy of $f_2(A/t)t=(c+(A/t)^\alpha)t$. The optimal t is set to $$A\left(\frac{\alpha-1}{c}\right)^{1/\alpha},$$

which sets the derivative of the above expression to zero. Therefore, the minimum energy is achieved at rate $r_{opt}$ as indicated above.

An illustrative embodiment of a batch-based algorithm under the above assumptions may be described in more detail as follows. The algorithm partitions time into arrival intervals of length $T_1, T_2, \ldots,$ . During each arrival interval, traffic of total size 2B arrives. It should be noted that this arrangement is distinct from the embodiment described in conjunction with FIG. 4, in which the batch size is B rather than 2B, although other batch sizes can be used in other embodiments. If the ith interval finishes at time $t_i$, then this traffic of size 2B is served during the service interval $[t_i, t_i+T_i')$ at rate $r=\max\{r_{opt}, 2B/T\}$ where $T_i'=2B/r$. If $r=r_{opt}$, such a service interval is a minimum-rate service interval, and the corresponding arrival interval $[t_i-T_i, t_i)$ a minimum-rate arrival interval.

Note that multiple service intervals may overlap if the arrival intervals have varying lengths. Let r(I) be the service rate associated with service interval I. At time t, the server serves at the rate r(t), which is the total rate $$\sum_{I: t \in I} r(I)$$

over all service intervals that contain t.

To analyze the energy consumption of the above-described batch-based algorithm, we need to bound the combined rate r(t), which requires knowing how the service intervals overlap. We first observe that two min-rate service intervals never overlap, since such service intervals are shorter than their corresponding arrival intervals which do not overlap one another. We now bound the combined rate r(t) at time t. Consider all service intervals that contain t. Among those, let I(t) be the non-min-rate service interval with the latest starting time.

It can be shown that if I(t) exists, $r(t) \leq 8B/|I(t)|$, and otherwise, $r(t)=r_{opt}$. This can be shown as follows. If only a min-rate service interval contains t, then $r(t)=r_{opt}$. Otherwise, let $t_1<t_2<\ldots<t_J<t$ be the starting times of non-min-rate intervals, where $t_J$ is the starting time of I(t). Note that $t-t_1 \geq 2(t-t_2) \geq \ldots \geq 2^{J-1}(t-t_J)$ and that $t-j_{J-1} \geq |I(t)|$. We therefore have $$r(t) \leq r_{opt} + \frac{2B}{|I(t)|} + \sum_{1 \leq j < J} \frac{2B}{t-t_j} \leq$$

$$r_{opt} + \frac{2B}{|I(t)|} + \frac{4B}{t-t_{J-1}} \leq r_{opt} + \frac{6B}{|I(t)|} \leq \frac{8B}{|I(t)|}$$

It can also be shown that the energy consumption under the batch-based algorithm is at most $8^\alpha \text{Opt}_B$, as follows. If I(t) does not exist, then t is in a min-rate service interval. The corresponding min-rate arrival interval has traffic arrivals of size 2B, for which the optimal algorithm has to serve at least B during the arrival interval. A lower bound on the optimal energy consumption to serve traffic B is obtained by serving it at rate $r_{opt}$. Meanwhile, the algorithm serves traffic of size 2B at rate $r_{opt}$. Hence, the energy consumption due to the algorithm, $f_2(r_{opt})(2B/r_{opt})$, at most doubles the optimal consumption, $f_2(r_{opt})(B/r_{opt})$.

If I(t) exists, the energy-optimal algorithm could either serve B bits at $r_{opt}$ or at rate B/|I(t)|. In the former case, B/I(t)<$r_{opt}$ and 2B/I(t)≥$r_{opt}$ since I(t) is not a min-rate service interval. This shows that the optimal algorithm has to operate at $r_{opt}$ for a time duration that is at least I(t)/2. Hence, the ratio of the energy consumption due to the algorithm to the optimal energy consumption is at most, $$\frac{f_2(2B/|I(t)|)|I(t)|}{f_2(r_{opt})|I(t)|/2} = 2.$$

In the latter case, the algorithm operates at rate at most 8B/|I(t)| and an energy-optimal algorithm operates at rate at least B/|I(t)|. Hence the ratio is at most $$\frac{f_2(8B/|I(t)|)}{f_2(B/|I(t)|)} < 8^\alpha.$$

With respect to the queue bound, it can be shown that the queue size under the batch-based algorithm is $$O\left(B\log_2 \frac{\sigma}{r_{opt}}\right).$$

As noted previously, the length of non-min-rate service intervals essentially halves, which means the average arrival rates of the corresponding arrival intervals doubles. The arrival rate in a single time period cannot be higher than the burst size σ. At the same time it cannot be lower than $r_{opt}$ for a non-min-rate interval. Hence, at most $$\log_2 \frac{\sigma}{r_{opt}}$$

non-min-rate service intervals can overlap. Further, it was noted above that at most one min-rate service interval can overlap. Since each interval has at most 2B traffic, the maximum queue size is $$2B\log_2 \frac{\sigma}{r_{opt}}.$$

If the batch-based algorithm keeps the energy consumption at most v times the minimal consumption that keeps queue size bounded by B, then the resulting queue size is $$\Omega\left(B\log_v \frac{\sigma}{r_{opt}}\right).$$

Accordingly, the batch-based algorithm can keep queues bounded by $$O\left(B\log_2 \frac{\sigma}{r_{opt}}\right)$$

using energy O(Opt$_B$). This queue-energy tradeoff is asymptotically the best possible in the present embodiment.

Embodiments of the present invention utilizing an AVR algorithm will now be described in greater detail.

Figure 5:
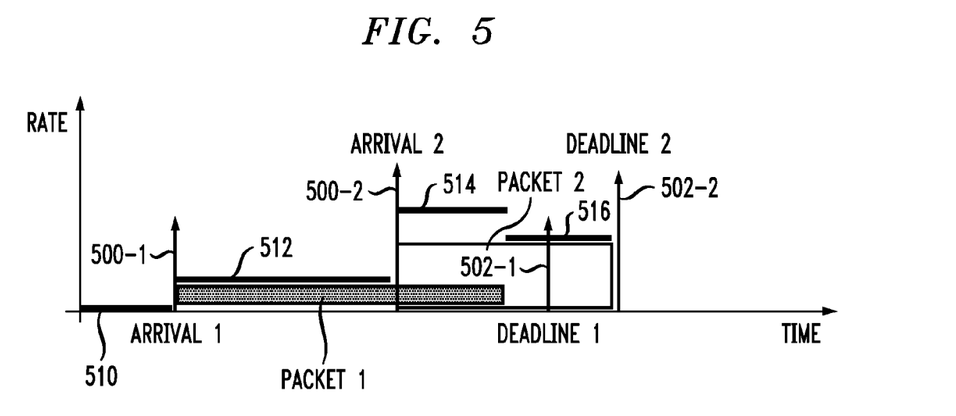

Referring now to FIG. 5, an illustrative embodiment is shown in which the operating rate of the processor 200 is controlled based on a non-preemptive AVR algorithm. In this embodiment, each arriving packet has an arrival time and a deadline by which the packet must be processed. As shown in the FIG. 5 diagram, a first packet denoted Packet 1 has an arrival time denoted Arrival 1 at 500-1 and a deadline denoted Deadline 1 at 502-1, and a second packet denoted Packet 2 has an arrival time denoted Arrival 2 at 500-2 and a deadline denoted Deadline 2 at 502-2. The algorithm in this embodiment respects all the deadlines while minimizing the energy used, again using the above-described power-rate function $f_2(x)$ having non-zero base power.

It will be shown below that the AVR algorithm illustrated in FIG. 5, in a single-server model with a given set of arrival and departure times, meets all the deadlines and uses energy that is within a constant factor of optimal. This result is also extended to a connection-based multiple-server model using Weighted Fair Queuing (WFQ).

The FIG. 5 algorithm in the single-server model proceeds in the following manner. Initially, compute or otherwise determine the optimal operating rate $r_{opt}$ in the manner described previously. For each packet p with arrival $A_p$, deadline $D_p$ and packet size $L_p$, the service rate for that packet is determined as follows:

1. If $r_{opt} \le L_p/(D_p-A_p)$, allocate service rate $L_p/(D_p-A_p)$ to packet p during time period [$A_p, D_p$]. Packet 1 is allocated in this manner in FIG. 5.

2. If $r_{opt} > L_p/(D_p-A_p)$, allocate service rate $r_{opt}$ to packet p during time period [$A_p, A_p+L_p/r_{opt}$)]. Packet 2 is allocated in this manner in FIG. 5.

For a given time period, the combined service rate over all packets being processed is the rate at which the processor operates for that time period. Packets are served in the order of earliest deadline first using the rates defined above.

In accordance with the above-described algorithm, the rate as shown in FIG. 5 increases from zero rate 510 prior to the arrival of Packet 1, to rate 512 from the arrival of Packet 1 to the arrival of Packet 2, to a combined rate 514 until the end of Packet 1, and then at rate 516 until the end of Packet 2.

In the multiple-server model, there is a set of connections in the network. For a given connection i, there is a burst size $\sigma_i$, a hop count $k_i$ and an average arrival rate $r_i$. The non-preemptive AVR algorithm in this embodiment then sets the appropriate per-hop deadline to be $(\sigma_i+j)/r_i$ for the jth hop. This arrangement provides a guaranteed end-to-end delay bound for connection i that meets the WFQ delay bound, while also bounding energy consumption with respect to optimal consumption. The AVR rate adaptation illustrated in FIG. 5 can be advantageously combined with WFQ scheduling in control module 210 to provide improved energy efficiency while maintaining a stable network configuration with acceptable bounds on queue length and end-to-end delay. Again, other scheduling algorithms can be combined with AVR rate adaptation in other embodiments.

In a conventional implementation of AVR with zero base power using power-rate function $f_i(x)$, each packet p of size $l_p$ arrives with an arrival time $s_p$ and a deadline $d_p$. The server allocates rate $l_p/(d_p-s_p)$ with respect to packet p throughout the duration $[s_p,d_p]$. At time t, the total service rate is defined to be $$r(t) = \sum_{p: t \in [s_p, d_p]} l_p / (d_p - s_p).$$

At any time, AVR serves the packet with the earliest deadline $d_p$, and therefore allows packet preemption. Because of the definition of r(t), it can be shown that AVR respects all packet deadlines. It can also be shown that under power-rate function $f_1(x)$, the AVR algorithm guarantees every packet meets its deadline with preemption and the energy consumption is at most $g_\alpha$ times the optimal, where $$g_\alpha = 2^{\alpha 11} \alpha^\alpha.$$

Note that without preemption, AVR cannot guarantee all deadlines are met. Consider the following example. A packet $p_1$ with a large size arrives at time 0 with a lenient deadline, and $p_1$ is serviced starting at time 0 as it is the only packet. At time $\epsilon>0$, packet $p_2$ arrives with a stringent deadline. Without preemption, $p_2$ cannot be served until $p_1$ is done. Since $p_1$ is a large packet, $p_2$ can miss its deadline by a large amount.

The FIG. 5 algorithm is an example of a non-preemptive AVR under the power-rate function $f_2(x)$. This type of algorithm is also referred to herein as an NP-AVR2 algorithm. For packet p, the server allocates rate $$r_p = (l_p + L_{max})/(d_p - s_p)$$

throughout the duration $[s_p, d_p]$, where $L_{max}$ is the maximum packet size. At time t, the total service rate is defined to be $\max\{r_{opt}, r(t)\}$, where $$r(t) = \sum_{p: t \in [s_p, d_p]} r_p,$$

and where $$r_{opt} = \left(\frac{c}{\alpha - 1}\right)^{1/\alpha}$$

as given previously. NP-AVR2 chooses the next packet to serve only when it finishes serving the current packet and it chooses the one with the earliest deadline among those already arrived. The purpose of NP-AVR2 is to provide bounded energy consumption and ensure deadlines are met.

It can be shown that, under power-rate function $f_2(x)$, the NP-AVR2 algorithm guarantees every packet meets its deadline. This can be seen as follows. For packet p let $W_p$ be the finishing time under NP-AVR2, and let $G_p$ be the finishing time if all packets are served fractionally, i.e., if each packet p receives service at rate $r_p$ during $[s_p,d_p]$. By definition, $G_p = s_p + l_p/r_p$. Thus, all deadlines are met if $W_p \leq G_p + L_{max}/r_p = d_p$. Consider a busy period. Order the packets in this period with respect to $W_p$, their finishing time under NP-AVR2. For p, let q be the latest packet, with respect to $W_p$, such that $G_q > G_p$ and $W_q < W_p$. In other words, q is the latest packet whose fractional finishing time is after p but whose integral finishing time is before p. Let Q be the set of packets whose NP-AVR2 finishing time is in the interval $(W_q, W_p)$.

We identify two relationships, expressed by corresponding equations below. The first relationship holds since packets in Q are served after q under NP-AVR2 and the interval is busy. To see the second relationship, note that all packets in Q must arrive after q starts being serviced under NP-AVR2, and let $W_q' < W_q$ be this starting time. Moreover, all packets in Q are served during $[W_q', G_p]$.

$$\int_{W_q}^{W_p} r(t) dt = \sum_{pp \in Q} l_{pp}$$

$$\sum_{pp \in Q} l_{pp} \leq \int_{W_q'}^{G_p} r(t) dt.$$

The above implies $$\int_{G_p}^{W_p} r(t) dt \leq \int_{W_q'}^{W_q} r(t) dt = l_q.$$

The NP-AVR2 algorithm guarantees that the total rate r(t) during $[G_p, Q_p]$ is at least $r_p$. Therefore, $W_p \leq G_p + l_q/r_p \leq G_p + L_{max}/r_p = d_p$.

It can also be shown that, if $$\gamma = \max_p \frac{l_p + L_{max}}{l_p},$$

the energy consumption by the NP-AVR2 algorithm is at most $\gamma^\alpha \alpha g_\alpha + 1$ times the optimal. This is seen as follows. Let Opt be the optimal energy consumption. The consumption under NP-AVR2 is $$\int_t \max\{r_{opt}, r(t)\} dt = \int_{t: r(t) \geq r_{opt}} f_2(r(t)) dt + \int_{t: r(t) < r_{opt}} f_2(r_{opt}) dt.$$

We first bound the first term by comparing it against $$\int_t f_1(r'(t)) dt$$

where $r_p' = l_p/(d_p - s_p)$ and $$r'(t) = \sum_{p: t \in [s_p, d_p]} r_p'.$$

$f_2(r(t)) = c + r(t)^\alpha = (\alpha-1) r_{opt}^\alpha - r(t)^\alpha$ $\leq \alpha r(t)^\alpha = \alpha f_1(r(t)) \leq \gamma^\alpha f_1(r'(t)).$ Therefore, $$\int_{t: r(t) \geq r_{opt}} f_2(r(t)) dt \leq \alpha \gamma^\alpha \int_t f_1(r'(t)) dt \leq \alpha \gamma^\alpha g_\alpha Opt$$

Note that the Opt here is with respect to $f_2(r(t))$ but it upper bounds the optimal energy consumption with respect to $f_1(r'(t))$.

We now bound the second term for when $r(t)<r_{opt}$. Let $$A = \int_{t:r(t)<r_{opt}} r_{opt} dt$$

be the total amount of traffic processed by NP-AVR2 during these times. NP-AVR2 consumes the least amount of energy for processing this traffic of size A, since at these times the algorithm only works at rate $r_{opt}$ or zero. Further, A is trivially upper bounded by the total traffic arrivals. Therefore, the corresponding energy consumed by NP-AVR2 is at most Opt. Combining two cases, we have $$\int_t \max\{r_{opt}, r(t)\} dt \leq (\alpha g_\alpha \gamma^\alpha + 1) Opt.$$

Rate-adaptive versions of Generalized Processor Sharing (GPS) and WFQ algorithms will now be described in greater detail. The traditional GPS algorithm runs at a fixed speed and partitions service among backlogged connections according to the connection injection rate $\rho_i$. The traditional WFQ is a discretized packet-by-packet version of GPS.

In a rate-adaptive GPS (RA-GPS) algorithm, a server operates at rate $$\sum_i \rho_i$$

where the sum is over all backlogged connections. Each backlogged connection i then receives a service rate of $\rho_i$. However, RA-GPS defined as such when converted to the packetized version rate-adaptive WFQ (RA-WFQ) can lead to a large delay if a packet is stuck behind a large packet and the server is reduced to low service rate. This is the same situation as described previously.

We define RA-GPS as follows. For packet p from connection i, we specify a time sequence $a_j^p$ for $0 \leq j \leq K_i$, where $[a_{j-1}^p, a_j^p]$ is the duration when the algorithm will schedule p to go through the jth server. The values of $a_j^p$ affect the delay and energy consumption bounds. Let $$v_{p,j} = (l_p + L_{max})/(a_j^p - a_{j-1}^p).$$

If s is the jth server, then s allocates rate $v_{p,j}$ during $[a_{j-1}^p, a_j^p]$, an with respect to p. Note that this definition is analogous to that given above for NP-AVR2. Again, the term $L_{max}/(a_j^p - a_{j-1}^p)$ is to ensure that during the RA-GPS to RA-WFQ conversion a packet will not be stuck behind a large packet for too long.

We now emulate RA-GPS to obtain RA-WFQ in the same way that WFQ emulates GPS. RA-WFQ runs RA-GPS in the background. Suppose RA-WFQ finishes serving a packet at time t. RA-WFQ then picks an unserved packet that has the earliest finishing time under RA-GPS, assuming no more packets arrive after t. In addition, RA-WFQ sets the server rate equal to the rate used by RA-GPS.

Suppose each packet p has an arrival time $s_p$ and $d_p$. Let $Opt_{s,d}$ be the optimal energy consumption in order to meet every packet deadline $d_p$.

Let $\gamma = \max_{p,j} \frac{(l_p + L_{max})(d_p - s_p)}{l_p(a_j^p - a_{j-1}^p)}.$ If $s_p \leq a_j^p \leq d_p$ for all j, then every deadline $d_p$ can be met and the energy used by RA-WFQ is at most $\alpha \gamma^\alpha g_\alpha + 1$ times $Opt_{s,d}$. This can be shown as follows. Given specified $a_j^p$, for $0 \leq j \leq K_i$, it follows from previous description herein that a session-i packet p finishes being served at its jth server by time $a_j^p$ under RA-WFQ. Therefore, every packet meets its deadline $d_p$.

To bound the energy consumption under RA-WFQ, note that under the energy-optimal schedule the jth server on the path for packet p served the packet during the interval $[s_p, d_p]$. Therefore the energy used is no less than the energy used if each server is presented with a separate packet with arrival time $s_p$ and deadline $d_p$.

For packet p, server e and time t define $v_{p,e}'(t) = l_p/(d_p - s_p)$ if server e is on the path for packet p and $s_p \leq t \leq d_p$ and $v_{p,e}'(t) = 0$ otherwise. The following holds as the $Opt_{s,d}$, the optimal with respect to $$f_2\left(\sum_p v_{p,e}\right)$$

under RA-WFQ, is an upper bound on the optimal with respect to $$f_1\left(\sum_p v_{p,e}'\right),$$

and the latter is related to the energy consumption by AVR by a factor of $g_\alpha$ as follows $$Opt_{s,d} \geq \frac{1}{g_\alpha} \int_t \sum_e f_1\left(\sum_p v_{p,e}'(t)\right) dt.$$

The rest of the analysis is similar to that given previously, and the ratio of $\alpha \gamma^{\alpha g}{}_\alpha + 1$ follows.

As a specific application of the above result, we define $$a_0 = s_p + \sigma_i/\rho_i$$
$$a_j = a_{j-1} + (l_p + L_{max})/\rho_i \text{ for } j \geq 1$$

The analysis above then implies an end-to-end delay bound as well as a bound on the energy consumption. More particularly, let $$\gamma = \max_{p,j} \frac{K_i(l_p + L_{max})}{l_p}.$$

RA-WFQ then achieves an end-to-end delay bound of $$\frac{\sigma_i}{\rho_i} + \frac{K_i(l_p + L_{max})}{\rho_i}$$

using energy that is at most $\alpha \gamma^{\alpha g}{}_\alpha + 1$ times the optimal energy required to satisfy this end-to-end delay bound.

The above-described batch-based and AVR rate adaptation algorithms in the illustrative embodiments are implemented independently within each network device. They are therefore fully distributed, without any use of centralized control, although as previously indicated such an implementation is not a requirement of the present invention, and fully or partially centralized control can be used in other embodiments.

Advantageously, it can be shown that the exemplary rate adaptation algorithms of FIGS. 4 and 5 when combined with appropriate scheduling algorithms such as those noted above result in energy efficient and stable network configurations in which queue length and end-to-end delay are suitably bounded.

As mentioned above, embodiments of the present invention may be implemented at least in part in the form of one or more software programs that are stored in a memory or other computer-readable storage medium of a network device or other processing device of a communication network. As an example, network device components such as the scheduler 212 and rate adaptation logic 214 may be implemented at least in part using one or more software programs.

Of course, numerous alternative arrangements of hardware, software or firmware in any combination may be utilized in implementing these and other system elements in accordance with the invention. For example, embodiments of the present invention may be implemented in one or more ASICS, FPGAs or other types of integrated circuit devices, in any combination. Such integrated circuit devices, as well as portions or combinations thereof, are examples of "circuitry" as the latter term is used herein.

It should again be emphasized that the embodiments described above are for purposes of illustration only, and should not be interpreted as limiting in any way. Other embodiments may use different types of networks, device configurations, and communication media, depending on the needs of the particular application. Alternative embodiments may therefore utilize the techniques described herein in other contexts in which it is desirable to provide energy efficiency in a communication network by coordinated scheduling and processor rate adaptation. The particular rate adaptation techniques disclosed can be combined with a variety of different types of scheduling algorithms in order to produce stable network configurations with bounded queue lengths and packet delays. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising the steps of:
   receiving packets in a network device of a communication network;
   scheduling the packets for processing from one or more queues of the network device; and
   controlling an operating rate of a processor of the network device based at least in part on an optimal operating rate of the processor and a packet arrival rate;
   wherein controlling the operating rate comprises at least one of adjusting a clock speed of the processor and adjusting a service rate of the processor;
   wherein the optimal operating rate of the processor is determined using a non-zero base power of the processor and a tangent line of a power-rate curve of the processor that passes through an origin point of a coordinate system of the power-rate curve; and
   wherein the packet arrival rate is determined by accumulating a designated number of the received packets and computing the packet arrival rate over the accumulated packets.

2. The method of claim 1 wherein the controlling step comprises controlling the operating rate of the processor such that the processor either operates at or above the optimal operating rate or is substantially turned off.

3. The method of claim 1 wherein the optimal operating rate of the processor falls on the tangent line.

4. The method of claim 1 wherein the packet arrival rate is determined by
   determining an average arrival rate of the accumulated packets; and
   wherein the operating rate of the processor is set based at least in part on the average arrival rate and the optimal operating rate.

5. The method of claim 1 wherein the packets are accumulated in batches of B packets over respective processing intervals, where B denotes a specified number of packets, x denotes a number of units of time needed to accumulate a given batch of B packets, and further wherein x is permitted to vary from batch to batch.

6. The method of claim 5 wherein if $B/x \geq r_{opt}$, the operating rate of the processor is controlled based at least in part on B/x for the next x units of time, where $r_{opt}$ denotes the optimal operating rate.

7. The method of claim 5 wherein if $B/x < r_{opt}$, the operating rate of the processor is controlled based at least in part on $r_{opt}$ for the next $B/r_{opt}$ units of time, and then set to zero for the remaining $x - B/r_{opt}$ units of time, where $r_{opt}$ denotes the optimal operating rate.

8. The method of claim 1 wherein for a given packet p having arrival $A_p$, deadline $D_p$ and packet size $L_p$, and wherein if $r_{opt} \leq L_p/(D_p - A_p)$, the operating rate of the processor is controlled based at least in part on allocating rate $L_p/(D_p - A_p)$ to packet p during time period $[A_r, D_r]$, where $r_{opt}$ denotes the optimal operating rate.

9. The method of claim 1 wherein for a given packet p having arrival $A_p$, deadline $D_p$ and packet size $L_p$, and wherein if $r_{opt} > L_p/(D_p - A_p)$, the operating rate of the processor is controlled based at least in part on allocating rate $r_{opt}$ to packet p during time period $[A_p, A_p + L_p/r_{opt})]$, where $r_{opt}$ denotes the optimal operating rate.

10. The method of claim 1 wherein the controlling step is repeated for each of a sequence of processing intervals.

11. The method of claim 10 wherein adjacent ones of the processing intervals are permitted to partially overlap with one another, and the operating rate of the processor is controlled based at least in part on a combination of rates determined individually for respective overlapped portions of the adjacent intervals.

12. The method of claim 1 wherein the step of scheduling the packets for processing further comprises scheduling the packets on a nearest-to-source basis such that one of the packets that has traveled a shorter distance from its source in the network is given priority over another one of the packets that has traveled a longer distance from its source in the network.

13. The method of claim 1 wherein the step of scheduling the packets for processing further comprises scheduling the packets on a farthest-to-go basis such that one of the packets that has a longer distance to travel to its destination in the network is given priority over another one of the packets that has a shorter distance to travel to its destination in the network.

14. The method of claim 1 wherein the step of scheduling the packets for processing further comprises scheduling the packets in accordance with at least one of a weighted fair queuing scheduling policy and a generalized processor sharing scheduling policy.

15. An article of manufacture comprising a non-transitory computer-readable storage medium having embodied therein executable program code that when executed by the processor of the network device causes the network device to perform the steps of the method of claim 1.

16. A network device comprising:
a processor having a controllable operating rate;
a memory coupled to the processor and comprising one or more queues;
network interface circuitry configured to support communication between the network device and one or more additional devices of a communication network; and
a control module;
wherein packets are received via the network interface circuitry and scheduled by the control module for processing from the one or more queues of the memory;
wherein the operating rate of the processor is controlled by the control module based at least in part on an optimal operating rate of the processor and a packet arrival rate;
wherein the operating rate of the processor is controlled by at least one of adjusting a clock speed of the processor and adjusting a service rate of the processor;
wherein the optimal operating rate of the processor is determined using a non-zero base power of the processor and a tangent line of a power-rate curve of the processor that passes through an origin point of a coordinate system of the power-rate curve; and
wherein the packet arrival rate is determined by accumulating a designated number of the received packets and computing the packet arrival rate over the accumulated packets.

17. The network device of claim 16 wherein the packets are scheduled for processing on one or more of:
a nearest-to-source basis such that one of the packets that has traveled a shorter distance from its source in the network is given priority over another one of the packets that has traveled a longer distance from its source in the network;
a farthest-to-go basis such that one of the packets that has a longer distance to travel to its destination in the network is given priority over another one of the packets that has a shorter distance to travel to its destination in the network;
a weighted fair queuing basis; and
a generalized processor sharing basis.

18. The network device of claim 16 wherein the control module comprises a combined scheduler and rate adaptation module.

19. The network device of claim 16 wherein the control module is implemented at least in part in the form of software executed by the processor.

20. The method of claim 1 wherein the optimal operating rate of the processor comprises an operating rate that consumes a lowest amount of power per bit.

* * * * *

UNITED STATES PATENT AND TRADEMARK OFFICE
CERTIFICATE OF CORRECTION

PATENT NO. : 8,797,868 B2  Page 1 of 1
APPLICATION NO. : 13/420192
DATED : August 5, 2014
INVENTOR(S) : Daniel Matthew Andrews et al.

It is certified that error appears in the above-identified patent and that said Letters Patent is hereby corrected as shown below:

In the Specification

Column 13, line 17, please change "$g_\alpha=2^{\alpha 11}\alpha^\alpha$" to -- $g_\alpha=2^{\alpha-1}\alpha^\alpha$ --

Column 14, line 55, please change "$f_2(r(t))=c+r(t)^\alpha=(\alpha-1)r_{opt}^\alpha - r(t)^\alpha$" to -- $f_2(r(t))=c+r(t)^\alpha=(\alpha-1)r_{opt}^\alpha + r(t)^\alpha$ --

Column 14, line 56, please change "$\leq \alpha r(t)^\alpha = \alpha f_1(r(t)) \leq \gamma^\alpha f_1(r'(t))$" to -- $\leq \alpha r(t)^\alpha = \alpha f_1(r(t)) \leq \alpha \gamma^\alpha f_1(r'(t))$ --

Column 16, lines 17 and 18, please change "$v_{p,e}'(t)$" to -- $v'_{p,e}(t)$ --

Column 16, lines 42 and 66, please change "$\alpha \gamma^{\alpha g_\alpha+1}$" to -- $\alpha \gamma^{\alpha g_\alpha +1}$ --

In the Claims

Column 18, line 41, in claim 8, please change "$[A_r, D_r]$" to -- $[A_p, D_p]$ --

Signed and Sealed this
Eleventh Day of November, 2014

Michelle K. Lee
*Deputy Director of the United States Patent and Trademark Office*